3,458,978
NON-PLANAR FILTER AND SUPPORTING MEANS
Maurice Davis, West Croydon, England, assignor to Davis Industrial Equipment Company Limited
Filed Sept. 12, 1967, Ser. No. 667,261
Int. Cl. B01d 29/06
U.S. Cl. 55—499    2 Claims

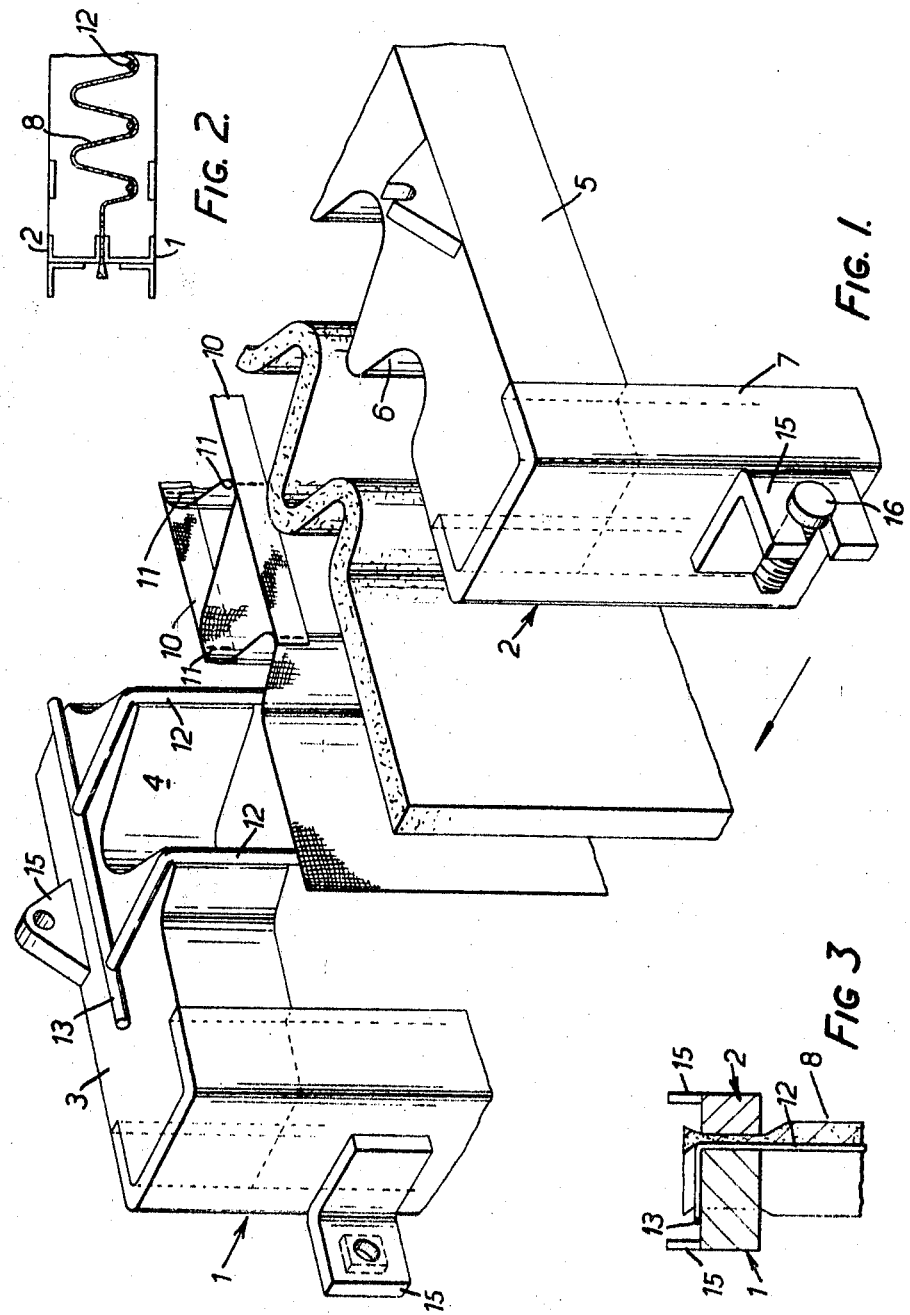

ABSTRACT OF THE DISCLOSURE

A filter comprising a filter element and shaping means having complementary undulating surfaces engaging opposite faces of the filter element to constrain the filter element to an undulating configuration.

---

This invention is concerned with improvements in and relating to filters.

According to the invention there is provided a filter comprising a filter element and shaping means having complementary undulating surfaces engaging opposite faces of the filter element to constrain the filter element to an undulating configuration.

The element is preferably a cellular foamed synthetic plastics material the cell walls of which have been ruptured and there may be provided a non-inflammable fabric on one or each face of the element. Alternatively either the foamed material or the fabric may be omitted.

In order that the invention may be well understood there will now be described one embodiment thereof, given by way of example only, reference being had to the drawing accompanying the provisional specification, in which:

FIGURE 1 is an exploded view of one corner of a filter embodying the invention; and FIGURES 2 and 3 are scrap sections in planes normal to one another through the filter shown in FIGURE 1.

The filter comprises two rectangular frames 1 and 2, frame 1 including at each of two opposite sides a shaping member 3 defining an undulating surface 4. Frame 2 likewise has at each of two opposite sides a shaping member 5 defining an undulating surface 6 complementary to the aligned undulating surface 4 of the other frame. The other two sides 7 of each frame have plane surfaces on the face corresponding to the undulations.

Between the frames in a filter element 8, preferably of cellular foamed synthetic plastics material the cell walls of which have been ruptured, and this element is clamped between the frames, being constrained to an undulating shape by the shaping members.

On the downstream face of the filter element there is a layer 9 of non-inflammable fabric such as Pluton B.1. This layer is preferably provided on each of its faces at opposite sides with tapes or the like 10 secured at intervals 11 to the fabric. These tapes facilitate location of the fabric on the frame.

Additionally, to support the undulations of the filter element, a support element made up of wires 12 secured to side wires 13 is provided on the downstream frame.

If desired a layer of fabric and a support element may also be provided on the upstream side.

To assemble the filter, the support element is located on one frame, provided with grooves 14 in the peaks of its shaping members to receive the side wires 12 the ends of which are turned over to lie outside the ends of the shaping members. A layer of the fabric is applied over the wires and undulating surfaces of the two shaping members of that frame, the edges of the fabric with their tapes projecting beyond the shaping members and beyond the other two sides of the frame. The filter element is then laid on the undulating fabric which will be held in position by the tapes engaging round the outside of the peaks of the undulations. The two frames are offered up to one another and secured, in the embodiment shown, by clamping bolts 16 engaging lugs 15 on the frames. Frame 1 will be the downstream side.

The filter element may be omitted and one or more layers of the fabric alone may be clamped between the frames. Alternatively the fabric may be omitted and the foamed synthetic plastics used alone.

The frame may be of channel or solid section, of plastic, metal, wood or ceramic.

It may be desirable to form the frames of cellular foamed synthetic plastics material in which the cell walls have been ruptured, in which case simple metal or other rigid frames may be applied to opposite faces of those frames and be urged together in suitable fashion to securely clamp the permeable frames and the filter element and/or fabric together.

If a layer of fabric is desired on each face of the plastics element, each layer may be secured as above to a frame by tapes before bringing the frames together, or the element may be located in an open-ended envelope to provide easy access to the fabric and element for washing independently.

The plastics element may be replaced by a knitted wire mesh filter element.

As will be appreciated, the filter is of simple construction and permits the filter medium to be removed from the filter, washed and replaced.

What I claim is:

1. A filter comprising a pair of peripheral rectangular open frames, a pair of spaced element shaping means on opposed sides of each frame, each shaping means being made from a single piece of material and having an undulating surface extending substantially perpendicular to the sides with the peaks of the undulating surface on the shaping means of each frame being received by the troughs of the undulating surface on the shaping means of the other frame, a sheet of filter material constituting a filter element, means for clamping said frames together, said sheet being clamped between the pairs of shaping means of the two frames, and a removable element support clamped between the two frames, the element support comprising a pair of side pieces lying outside of one frame and resting on the opposed sides thereof and a plurality of spaced cross pieces extending between said side pieces and from a peak of the shaping means on one side of said one frame to a peak on the other shaping means on the other side of the same frame, and the peaks of the shaping means of said one frame being grooved to provide seats for the cross-pieces of said filter element.

2. A filter according to claim 1, wherein the filter element is of cellular foamed synthetic plastics material the cell walls of which are ruptured.

(References on following page)

References Cited

UNITED STATES PATENTS

| | | | |
|---|---|---|---|
| 1,056,108 | 3/1913 | Lunken | 55—500 |
| 1,830,096 | 11/1931 | Dollinger | 55—500 |
| 2,074,294 | 3/1937 | Woodruff | 55—499 |
| 2,135,863 | 11/1938 | Walker | 55—499 |
| 2,502,560 | 4/1950 | Dahlman | 55—132 |
| 2,211,382 | 8/1940 | Nutting | 55—500 |
| 2,739,667 | 3/1956 | Palmore | 55—499 |
| 3,177,637 | 4/1965 | Davis | 55—497 |
| 3,183,286 | 5/1965 | Harms | 55—497 |
| 3,222,580 | 12/1965 | Hart | 55—500 |
| 3,227,592 | 1/1966 | Coates et al. | 55—499 |

HARRY B. THORNTON, Primary Examiner

BERNARD NOZICK, Assistant Examiner

U.S. Cl. X.R.

55—521, 522; 210—493